United States Patent [19]
Wilber

[11] 3,846,025
[45] Nov. 5, 1974

[54] FREQUENCY SENSITIVE LASER ROTARY MOTION SENSOR

[76] Inventor: Scott A. Wilber, 1512 Garfield Ave., Apt. 1, Louisville, Colo. 80027

[22] Filed: Apr. 2, 1973

[21] Appl. No.: 346,985

[52] U.S. Cl. ........................................ 356/106 LR
[51] Int. Cl. ............................................. G01b 9/02
[58] Field of Search ............................... 356/106 LR

[56] References Cited
UNITED STATES PATENTS

| | | | |
|---|---|---|---|
| 3,390,606 | 7/1968 | Podgorski | 356/106 LR |
| 3,411,849 | 11/1968 | Aronowitz | 356/106 LR |
| 3,462,708 | 8/1969 | McClure | 356/106 LR |
| 3,503,005 | 3/1970 | Mocker | 356/106 LR |
| 3,581,227 | 5/1971 | Podgorski | 356/106 LR |

*Primary Examiner*—Vincent P. McGraw
*Attorney, Agent, or Firm*—Roylance, Abrams, Berdo & Kaul

[57] ABSTRACT

A rotary motion sensor of the resonant laser bimodal optical cavity type is provided with a reference beam generating laser and feedback loop for locking the reference beam frequency to one mode. Corner modulation is provided to modulate the ring laser beams and prevent mode locking. The modulation thus introduced is demodulated out of the processed ring laser beams and the resulting signals are digitally processed to provide motion, rate and acceleration information.

6 Claims, 8 Drawing Figures

FREQUENCY SENSITIVE LASER ROTARY MOTION SENSOR

This invention relates to rotary motion sensing means and, more specifically, to a ring laser system for measuring rotary motion, particularly at small angular velocities, and for measuring angular displacements.

Various devices have been developed in the past for utilizing a fundamental phenomenon, sometimes referred to as the Sagnac interferometer effect, the early exploratory work in this field having been accomplished by Sagnac, Michaelson and others. More recent developments in the field employ continuous wave lasers and reflective devices to establish a "ring" in which coherent light is propagated in two directions around a closed optical circuit. Differences in frequency and phase of the light beams in the two directions are produced when the optical circuit is rotated about an axis perpendicular to the plane in which the circuit lies. A beat frequency is produced, which frequency is directly proportional to the rotational rate of the apparatus. Total angular displacement can also be determined because a standing wave is produced and the wavelength of the standing wave produces a measurement reference against which total rotary motion can be scaled.

Devices of this general type are sometimes referred to as "laser gyroscopes" because of the general similarity of the intended uses and functions to those of a rate gyro.

The theory of operation and specific examples of devices which form part of the prior art can be found in U.S. Pat. Nos. 3,627,422 Chodorow, 3,433,568 Skalski et al., and others, and need not be further discussed herein.

A review of these patents indicates a number of problem areas in the use of ring laser motion detectors, particularly when attempting to measure very low rotation rates or to resolve very small angular displacements. Measurement of low rotation rates is inhibited by the tendency of the frequencies of the two beams (clockwise and counterclockwise) to self-synchronize when they are close together, as is generally the case when low rotation rates are present. This tendency is referred to as mode locking. Efforts to overcome this difficulty have included the insertion of a bias frequency and other techniques. Unfortunately, these other techniques have introduced their own problems, including drift of the bias frequency and the like.

Additionally, it is rather difficult to measure low frequencies of the type which would indicate low rotation rates.

It is, therefore, an object of the present invention to provide a ring laser rotation sensor with improved sensitivity, accuracy and freedom from drift.

Another object is to provide a ring laser inertial reference indicator with improved characteristics.

Another object is to provide a ring laser rotation sensor having the capacity for accurately detecting angular acceleration or deceleration.

Another object is to provide a simple and relatively inexpensive technique for minimizing mode locking without the introduction of additional structure within the resonant ring laser path.

A further object is to provide a simple and relatively inexpensive technique for biasing the ring laser beams to produce a linear frequency output over the operating range.

Yet another object is to provide a ring laser rotation sensor which is readily adaptable to rugged and compact inertial guidance systems.

Broadly described, the sensor apparatus includes a closed optical path having a laser device in the path for generating and maintaining coherent light, the path also including reflective surfaces at corners thereof to maintain bimodal resonant radiation therein, i.e., radiation travelling in both clockwise and counterclockwise directions in the path. A reference beam generating system is also provided external of said path, the reference system including an additional laser generator for producing a coherent beam. Means is included in the sensor for coupling radiation of only one of the modes into an optical mixer and into other means for controlling the reference beam generator so as to maintain the frequency of the reference beam a known frequency spacing from the one mode. The other mode is coupled out of the loop and compared with the reference beam, resulting in a frequency difference which is representative of rotation rate and phase changes which represent total rotation.

In another embodiment, the foregoing concept is combined with means for affecting the closed loop or path to effect a cavity length change, thereby modulating the counter-rotating beams and preventing mode locking.

In a further embodiment, the above mentioned means for modulating the counter-rotating beams is employed to produce a bias or non-rotating output as well as prevent mode locking. This is accomplished through the use of the proper modulation signal and the expedient positioning of the modulator.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
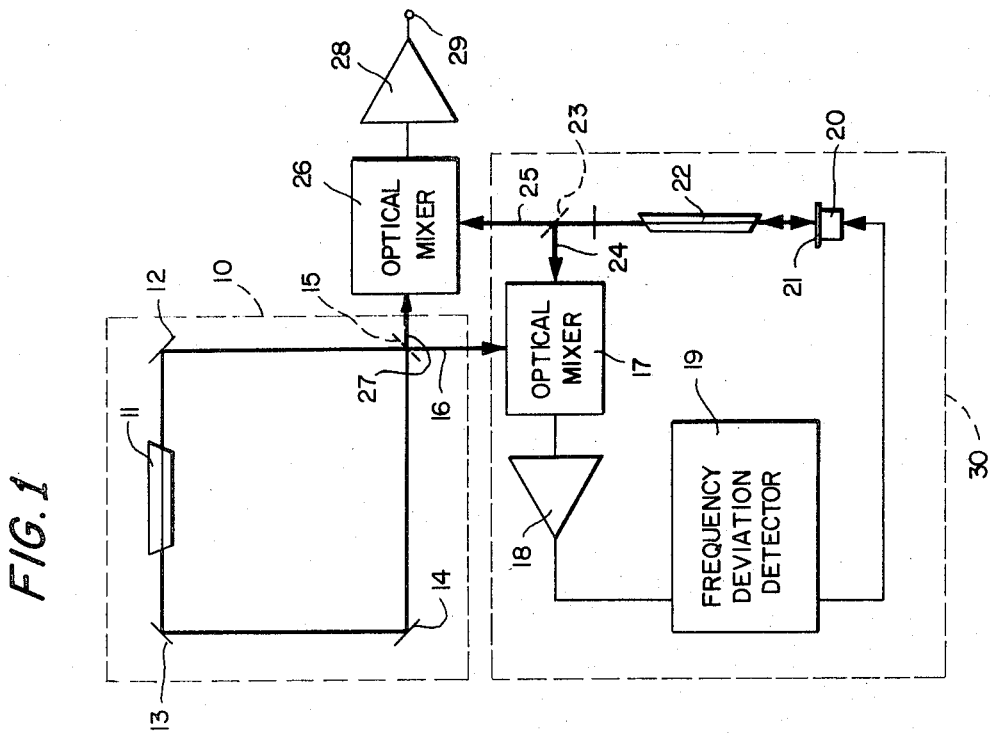
FIG. 1 is a schematic diagram, in simplified and block form, of one embodiment according to the invention.

Referring now to the drawings in detail, it will be seen that FIG. 1 shows a rotary motion sensor comprising a resonant ring indicated generally at 10 including a laser generator 11 which produces bimodal radiation, i.e., radiation emanating in both directions from the laser medium and capable of passing therethrough in both directions. Fixed reflective surfaces 12, 13 and 14 are mounted at corners of a polygon which includes the optical axis of a laser 11 at one side. A partially reflective surface 15 is provided at the remaining corner, surfaces 12–15 being effective to maintain the path in closed, resonant configuration in a well-known manner. As is also well known, reflective element 15 is a mirror which is sometimes referred to as a partial mirror or beam splitter which permits a portion of the incident radiation to pass through the surface to other devices. As will be recognized, radiation in the clockwise mode strikes mirror 15 at one angle and the radiation in the counterclockwise mode is incident at an angle 90° separated therefrom.

A portion of the clockwise mode of radiation passes through surface 15 in a beam 16 which is received by an optical mixer 17 of known configuration. Mixer 17 is a device capable of accepting two optical beams at different frequencies and of providing an electrical output representative of the frequency difference between the two beams. The output of mixer 17 is supplied to an amplifier 18, the amplified signal being supplied to a frequency deviation detector 19. Detector 19 produces an output signal when the output of amplifier 18 deviates from a predetermined frequency, the signal out of detector 19 being provided to a piezoelectric crystal 20. Crystal 20 is provided with a totally reflective surface 21, the surface being mounted on the crystal so that variations in the voltage of the crystal cause parallel motion of surface 21. A laser 22 is mounted with its optical axis perpendicular to surface 21, the radiation emanating from one end thereof being reflected from surface 21. Radiation from the other end of laser 22 is partially reflected from a partial mirror or beam splitter 23, one portion 24 of this beam being directed to optical mixer 17 for combination with beam 16. The other beam portion 25 passes through partial mirror 23 and is combined in an optical mixer 26 with a beam portion 27 of the counterclockwise mode in the resonant ring. The output of mixer 26 is coupled through an amplifier 28 to an output terminal 29 at which a signal representative of the behavior of the system is present.

As will be apparent from the foregoing, laser 22 and its associated components form a reference system indicated generally at 30, which reference system involves a feedback loop which maintains the frequency of the reference laser at a predetermined frequency below or above the frequency of the selected mode from the ring laser. The output which appears at terminal 29 is therefore a non-zero rest output frequency, i.e., the output frequency under conditions of zero rotation is different from zero. Note that this is accomplished without introducing any additional structure whatsoever into the resonant radiation optical loop 10. Thus, any degradation of the Q of the loop is avoided and yet a stable reference level is established. The optical mixer continually compares the clockwise mode beam with the reference beam portion 24 and produces a signal, through amplifier 18 and detector 19, which adjusts the frequency of laser 22 by moving mirror surface 21 until the output of mixer 17 represents the predetermined frequency.

At rest, the clockwise and counterclockwise mode frequencies are normally identical. Thus, a comparison of beams 25 and 27 should produce a signal out of mixer 26 which is the same as the signal out of mixer 17. This, however, is not a zero signal but represents the preselected difference set into and established by deviation detector 19 and crystal 20. Clockwise rotation causes a decrease in the frequency of the clockwise mode and concomitant decrease in the frequency of the reference beam. However, the counterclockwise beam has increased in frequency by an amount equal to the decrease in the clockwise beam. The difference between beams 25 and 27 thereby becomes equivalent to the preselected rest frequency plus or minus the rotational mode splitting and the output is truly representative of the rotation rate.

Figure 2:
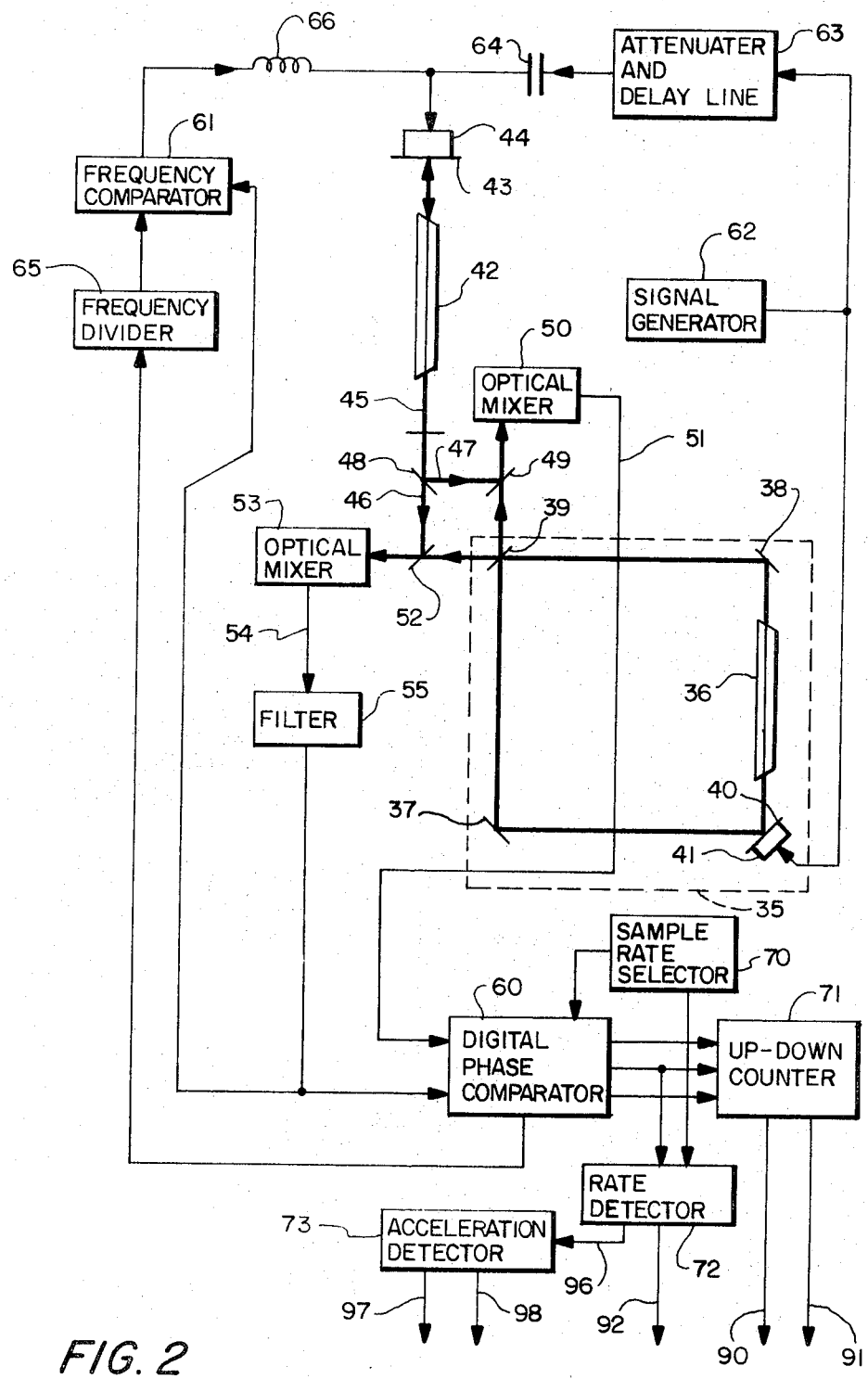
FIG. 2 is a schematic diagram, partially in block form, of a second embodiment according to the invention.

While the above-described system constitutes a significant improvement in the provision of non-zero rest frequency, the specific embodiment disclosed is simplified for purposes of initial discussion. A more complete apparatus with the further provision of digital signal processing and means for avoiding mode locking is shown in FIG. 2. In that figure, the closed optical loop is indicated at 35 and includes a laser 36, fixed totally reflective mirrors 37 and 38, a partial mirror or beam splitter 29 through which energy can be coupled to other portions of the system, and a totally reflective surface 40 mounted on a piezoelectric crystal 41 to which an input modulating signal can be applied. The apparatus of FIG. 2 also includes a reference beam generating system, similar in principle to that described with reference to FIG. 1, the reference beam system including a laser 42 and an end mirror 43 which is mounted on a piezoelectric crystal 44. Laser 42 produces a reference beam 45 which is divided into two beam components 46 and 47 by a partial mirror or beam splitter 48. The clockwise mode beam from the closed loop is combined with beam component 47 in a beam splitter 49 and the two beams are heterodyned together in an optical mixer 50 which produces an electrical output signal on a conductor 51. Beam 46 is combined with the counterclockwise mode beam in a beam splitter 52, the two being heterodyned together in an optical mixer 53. The output signal from mixer 53 is connected by a conductor 54 through a narrow band filter 55 to one input of a digital phase comparator 60 and to one input of a frequency comparator 61. The output of mixer 50 is coupled to the other input of phase comparator 60.

A signal generator 62 produces a signal having a sawtooth wave form which is connected to the input of piezoelectric crystal 41 and, through an attenuator and delay line circuit 63 and a coupling capacitor 64, to the electrical input of piezoelectric crystal 44. A constant frequency output supplied by a crystal oscillator in phase comparator 60 is coupled through a frequency divider 65 to frequency comparator 61 wherein a comparison with the output of filter 55 takes place. Comparator 61 produces an error voltage when there is a difference between the two frequencies applied thereto, this output being applied through an inductor 66 to the electrical input of crystal 44. The inductor 66 and capacitor 64 are provided to mutually isolate the attenuator and delay line from the frequency comparator so that the error voltage and the modulation from signal generator 62 can operate relatively independently on crystal 44.

Considering now the operation of the components thus far discussed, the counter-rotating or bimodal beams are produced as previously discussed in loop 35, the frequencies of these two beams being shifted in opposite directions as a direct function of rotational velocity. When the rotation rate is very low, mode locking must be avoided, the means for accomplishing this being the modulation of crystal 41 by the sawtooth signal output on generator 62. This input signal causes variations in the length of the resonant cavity represented by the laser system, producing corresponding changes in the frequencies of the counter-rotating beams. This modulation produces a substantial frequency difference between the counter-rotating beams around the ring, thereby reducing the possibility of mode locking. The modulation is subsequently cancelled by similar modulation of the reference beam.

Optical mixer 50 produces an output signal representative of the difference between the reference and clockwise mode signals, this difference being supplied as an electrical signal to the digital phase comparator. Similarly, the counterclockwise mode beam and a portion of the reference beam are combined in the mixer 53, filter 55 being provided to eliminate noise components. The modulation signal applied through attenuator 63 and capacitor 64 to crystal 44 modulates the reference beam in a manner similar to the modulation applied to crystal 41. Thus, the modulation applied to the reference and ring laser beams is the same and the outputs of the optical mixers do not reflect any portion of this modulation.

Through the expedient of frequency comparator 61 and the output of filter 55, a frequency correction signal is applied to crystal 44 in addition to the modulation signal so that the reference signal is tied to the counterclockwise mode signal. The output of mixer 53 is thus a constant frequency regardless of any rotational mode splitting. Filter 55 can, therefore, have a quite narrow bandwidth.

The phase comparator 60 is capable of distinguishing small phase shifts or frequency differences between the two inputs. The operation of the comparator is controlled by a sample rate selector 70 which has a changeable rate output which determines the sampling rate of the phase comparator. The three outputs of the digital phase comparator are connected to a bidirectional counter 71 and one output thereof is coupled, along with an output from the sample rate selector to a rate detector 72 which provides an output to an acceleration detector 73.

Figure 3:
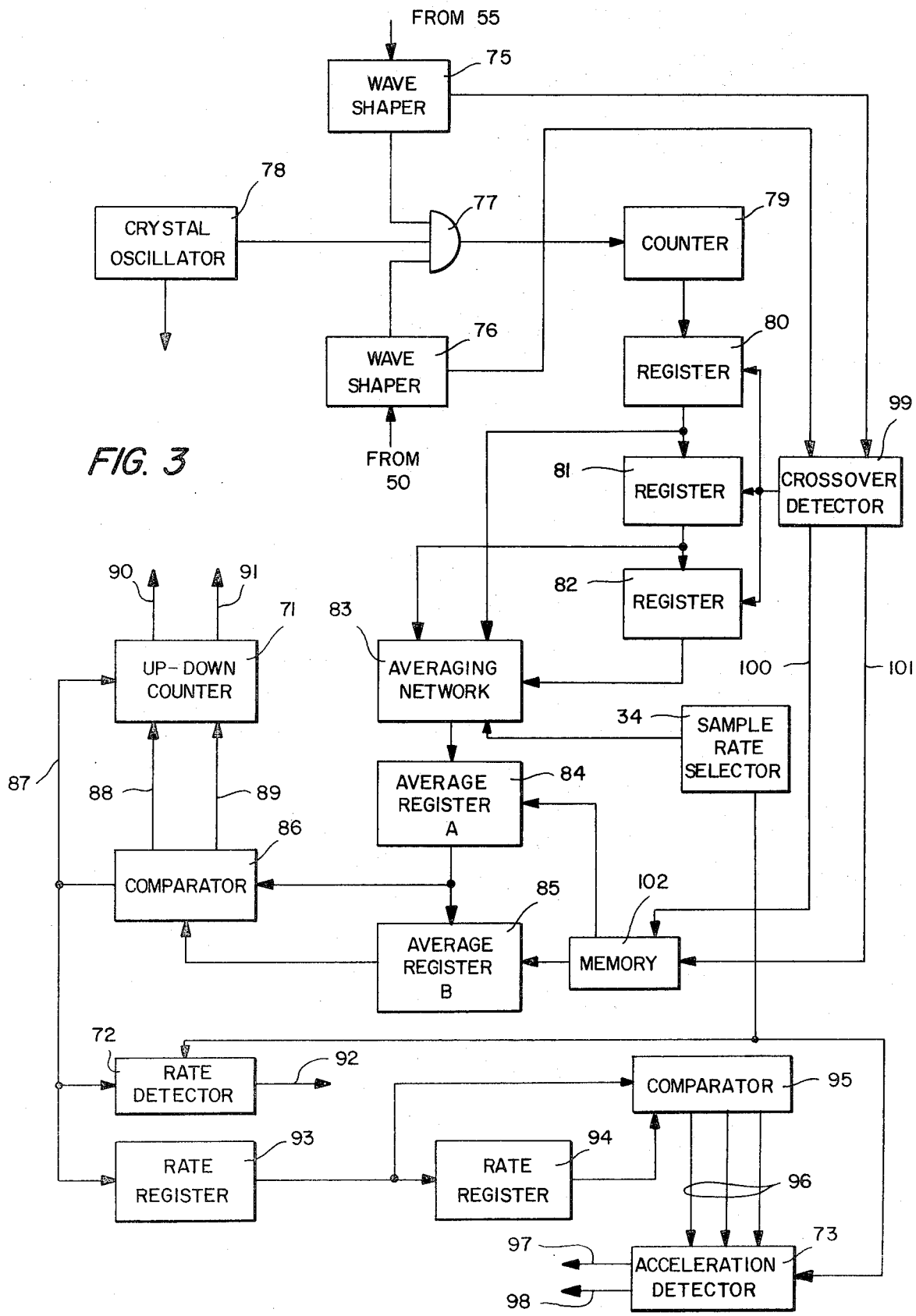
FIG. 3 is a schematic diagram, in block form, of digital processing means usable in the apparatus of FIG. 2.

The digital phase comparator will be briefly described with reference to FIG. 3 wherein it is seen that the two inputs from filter 55 and mixer 50 are applied to wave shaper circuits 75 and 76, respectively, the outputs of which are fast rise time pulses which correspond to the positive half cycles of the filter and mixer outputs and which are applied to inputs of a three input AND gate circuit 77. The third input, which is gated by the simultaneous existence of outputs from the shaper circuits, is the output of a crystal oscillator circuit 78. The pulses from the oscillator circuit which are gated through gate 77 are applied to and counted by a binary counter 79. Each time the count is stopped, the data is shifted out of the counter into registers 80, 81 and 82. The data is shifted sequentially down through these registers, but each time the data is shifted a parallel output is transferred simultaneously from all three registers to a parallel averaging network 83 wherein the three binary numbers are averaged. The three registers and the averaging network produce a running average of the last three samples from the counter. This has the effect of smoothing the output and reducing errors attributable to noise.

The data from the averaging network is shifted sequentially to an averaging register 84 and then to the averaging register 85. At each shift the data in average registers 84 and 85 are compared in a comparator circuit 86 which determines the absolute difference between the two inputs and transfers the resulting data on a conductor 87 to bidirectional counter 71. The comparator simultaneously determines which of registers 84 and 85 contained the larger number and commands the up-down counter to either add or substract the quantity transferred from the existing count, the command signals for these being transferred on one of conductors 88 or 89. The counter produces outputs 90 and 91 indicating the sense of rotation of the rotary motion detector and provides a continuously updated indication of the total angular displacement in suitable units.

The data on conductor 87 is also transferred to the rate detector 72 which determines a rate of change based on the time elapsed between samples and the magnitude of change per sample. The resulting rate of change signal is converted by the rate detector into a rate of rotation signal which is provided on a conductor 92 for external use.

The data on conductor 87 is also transferred sequentially to a rate register 93 and a rate register 94, which registers operate in a fashion similar to the average registers, networks and comparator previously described. The outputs of both registers are coupled to a comparator circuit 95 which produces three outputs, one constituting magnitude of change and the other two indicating which of registers 93 or 94 contained the larger number. These three outputs appear on conductors 96 which couple the data to the acceleration detector. The acceleration detector 73 determines the magnitude of acceleration of deceleration by detecting any change in rate over a given time interval. The outputs 97 and 98 therefrom indicate acceleration or deceleration and magnitude.

All data in the system (except where noted) are transferred in parallel to achieve the high transfer rate required. Also, all stages are clocked by the input signal itself except for those stages where data transfer rate is controlled by the sample rate selector 70. This selector controls the rate at which data is sampled by comparator 86 and all circuits following that point. The timing for the rate selector is obtained by dividing the signal frequency down to the desired rate. The variable sample rate allows data to be sampled at a relatively low rate, e.g., 10 times per second, when very low rotational rates are to be detected. Under such circumstances, data are still being sampled and processed by the counter and first three registers, but the existing average is only transferred from the averaging network 10 times per second. The sample rate also determines the proper conversion factor for the rate and acceleration detectors since they are both time dependent.

The crossover detector 99 is a logic circuit which determines when and in which direction the triggering pulses of the two input signals cross. The inputs to this circuit constitute the outputs from the wave shaper circuits 75 and 76, and the output from the crossover detector are provided to registers 80–82, commanding all three registers to accept the next sample from counter 40 so that the averaging network will produce an abrupt transition. At each crossover a pulse is also sent on one of two conductors 100 or 101, depending upon direction of crossing, to a memory circuit 102. The memory contains a permanent record of the number of counting frequency cycles in one complete signal cycle. When the memory receives a command from the crossover detector, it transfers the stored number to one of the average registers, depending again on the direction of crossing. This operation keeps the average registers updated whenever a crossing occurs and provides a true, continuous output.

As an example of the sensitivity and the accuracy of the apparatus described with reference to FIGS. 2 and 3, it can be assumed that the laser used for this device is a gas laser of the helium-neon type oscillating at approximately $4.7 \times 10^{14}$ Hertz. The dimensions of the rotation sensing loop are one meter on each side. The frequency difference maintained between the reference beam and the counterclockwise mode beam is 100 KHz. The counting frequency is 100 MHz or 1,000 times the bias frequency. Thus, each input cycle can be resolved into 1,000 parts.

Assuming that the sample rate selector is set for 10 samples per second, the minimum detectable frequency difference between the two input frequencies will be the sampling rate divided by the number of parts into which the input frequency can be resolved. In this example, that equals 0.01 Hz. The basic equation which represents the mode splitting relationship is as follows:

$$\Delta f = 4\Omega A/\lambda L \qquad (1)$$

which can be rewritten:

$$\Omega = \Delta f \lambda L/4A \qquad (2)$$

wherein $\Delta f$ equals the mode splitting frequency difference, $\lambda$ equals wave length, $L$ equals total length of the optical cavity, $A$ equals the area enclosed by the optical cavity and $\Omega$ equals angular velocity. Substituting the 0.01 Hz into Equation (2) yields a value of $\Omega = 6.33 \times 10^{-9}$ radians/second, which is approximately $1.35 \times 10^{-3}$ degrees/hour. The minimum resolvable angular displacement is $1.35 \times 10^{-4}$ arc/second or the displacement which would occur during the 0.1 second sampling interval at the minimum rotational rate. The minimum detectable acceleration or deceleration is $1.35 \times 10^{-2}$ degrees/hour/second. The operating range for rotational rate detection is approximately from $1.35 \times 10^{-3}$ to $10^3$ degrees/hour, clockwise or counterclockwise.

Figure 4:
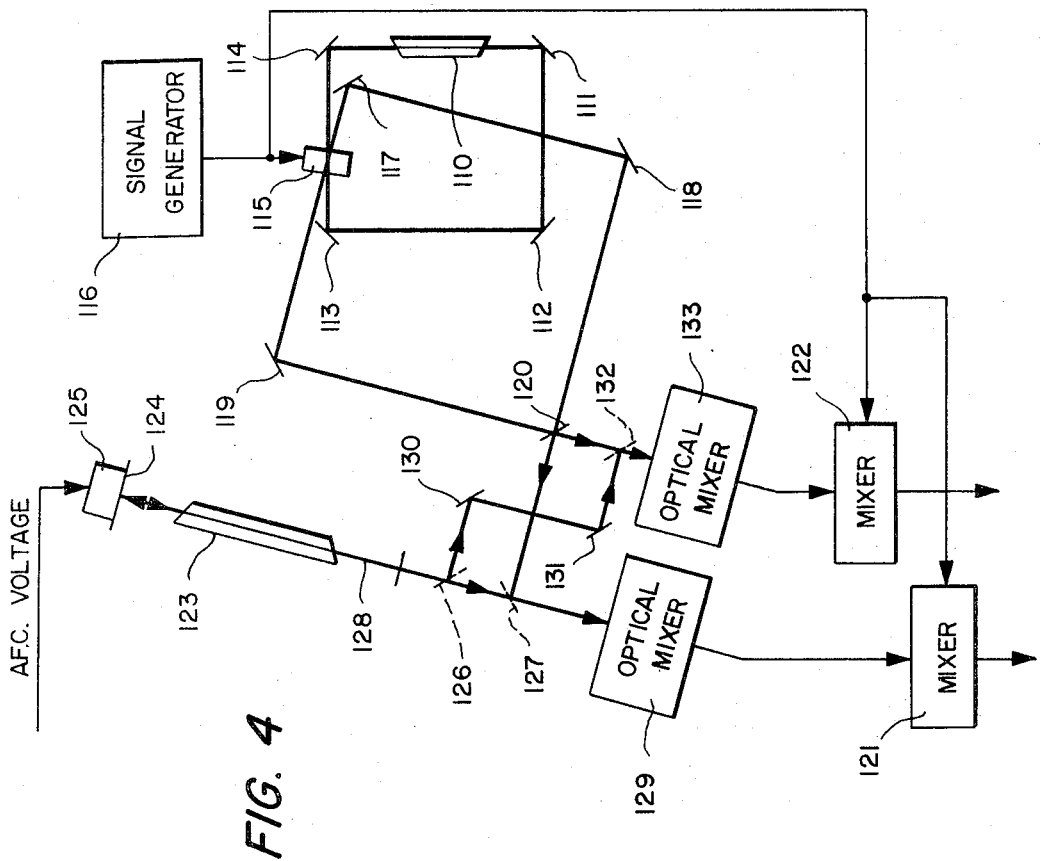
FIG. 4 is a schematic diagram of a portion of a system similar to FIG. 2 but incorporating a third embodiment of the invention.

FIG. 4 represents an alternative embodiment of the apparatus in which the same basic technique for providing a non-zero rest frequency is employed, but a different technique for mode splitting is involved. As will be seen, this embodiment is similar in the mode splitting aspect to that disclosed in U.S. Pat. No. 3,627,422 Chodorow. The basic closed loop includes a laser tube 110 and four fixed mirrors 111, 112, 113 and 114 at the corners of a square, forming the previously discussed resonant cavity. A modulator 115 is inserted in the path and is driven by a signal from a signal generator 116 to diffract and deflect a portion of the energy from both modes circulating in the primary loop into a second loop which is formed by three totally reflective surfaces 117, 118 and 119 and a partially reflective surface or beam splitter 120. The modulating electrical signal is also supplied to mixer circuits 121 and 122 which, as will be described, remove the effect of the anti-mode-locking modulation from the ultimate output signal.

A reference laser 123 generates a signal at a frequency spaced a predetermined amount from the rest frequency of the modes of the loops, and radiates energy in both directions. In one direction, the energy is reflected from an end mirror 124 which is mounted on a piezoelectric crystal 125. Crystal 125 is supplied with an automatic frequency control (AFC) voltage similar in nature to that provided to crystal 44 in FIG. 2.

Partially reflective mirrors 126 and 127 permit a portion of the reference beam 128 to pass to an optical mixer 129, these surfaces also permitting a clockwise component of the bimodal radiation from the second loop, which passes through mirror 120 to be combined with the reference beam component in mixer 129. Similarly, a component of the reference beam is reflected from partial mirror 126, totally reflective surfaces 130 and 131 and partial mirror 132 through which a component of the counterclockwise radiation passes to an optical mixer 133. The output of mixers 129 and 133 are combined with the modulation signal in mixers 121 and 122.

One of the output signals from mixer 121 or 122 is further processed to produce the AFC voltage supplied to crystal 125 and both of the mixer outputs are utilized in a manner similar to that described with reference to FIG. 2 to produce the desired outputs.

It will be recognized that the embodiment of FIG. 4, while operative and suitable for some applications, has the disadvantage of additional structure in the primary loop and also the additional complications of a second resonant loop.

Figure 5:
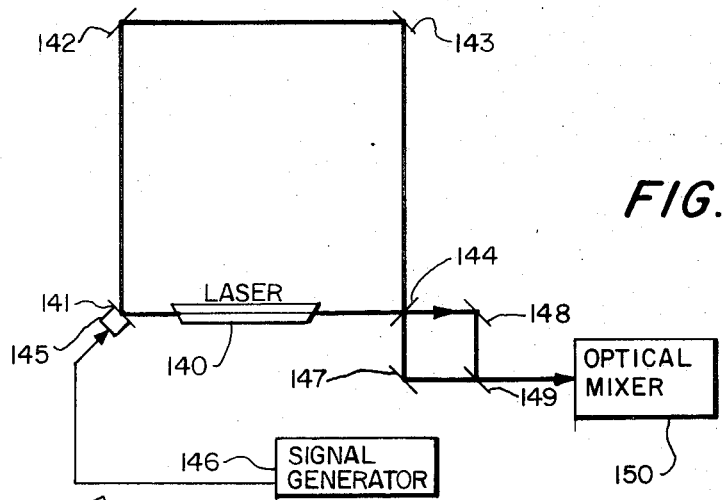
FIG. 5 is a schematic diagram, partially in block form, of a fourth embodiment according to the invention.

A schematic diagram of yet another embodiment is shown in FIG. 5 wherein the basic closed path is seen to include a laser 140, three fully reflective surfaces 141, 142 and 143, and a partially reflective surface 144. Mirror 141 is mounted on a piezoelectric crystal 145, this assembly being situated at a corner adjacent to the partial mirror 144. The crystal is driven by a high frequency saw-tooth signal supplied by a signal generator 146. The expansion and contraction of the crystal vary the resonant path length and produce a corresponding frequency modulation in the counter-rotating modes.

Reflective surfaces 147 and 148 and beam splitter 149 cooperate in the manner previously described to extract components of the clockwise and counterclockwise modes and to supply these to a suitable optical mixer 150.

As will be explained in detail below, the corner modulator situated as in FIG. 5 provides a means of reducing mode locking but also provides a bias frequency which permits determination of the sense of rotation of the loop. This is accomplished without the insertion of any structure within the resonant loop or any special signal processing external to the loop.

A similar bias frequency and mode-lock-reducing modulation may also be produced by the insertion of an electro-optical crystal within the resonant path. Electric fields across the crystal, produced by a signal generator similar to that in FIG. 5, cause variations of the speed of light within the crystal, which variations are equivalent to changes in cavity path length. This method, however, has the disadvantages of a reduction in cavity Q.

Figure 6:
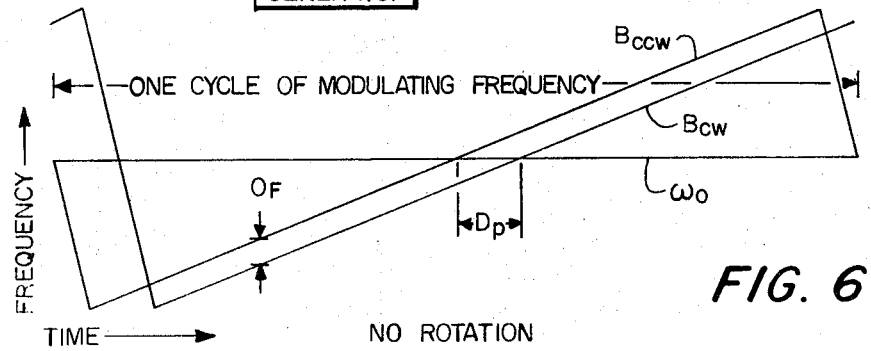
FIGS. 6–8 are graphs illustrating certain aspects of the operation of the apparatus of FIG. 5.
Figure 7:
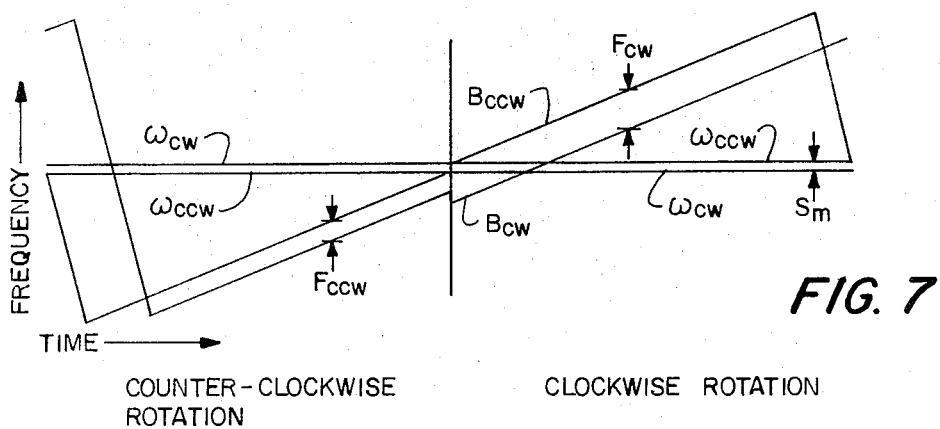
Figure 8:
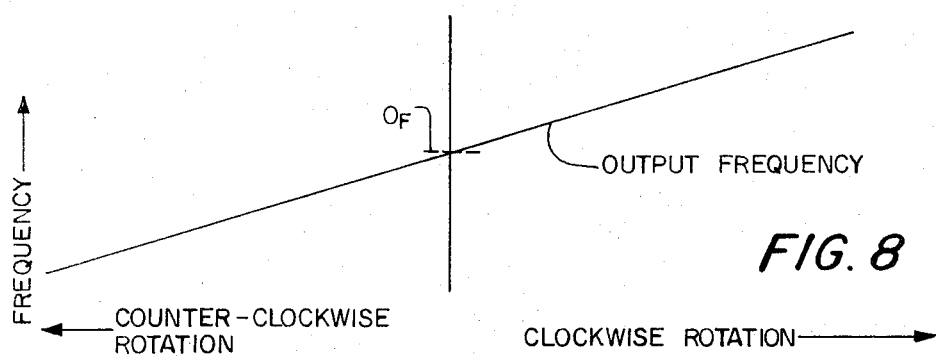

FIGS. 6, 7 and 8 are graphic representations of frequencies which may occur in the apparatus of FIG. 5. FIG. 6 represents the frequencies of the two modes as measured at partial mirror 144 where the light is sampled.

Since the lengths of the light paths from the modulator to the optical mixer 150 are different for the clockwise and counterclockwise beams, $B_{cw}$ and $B_{ccw}$, respectively, any frequency changes in the modes caused by the modulator will arrive at the optical mixer at slightly different times due to the difference in propagation times for the counter-rotating beams. This propagation delay time $D_p$ is equal to the difference in path length from the modulator clockwise to the mixer and from the modulator counterclockwise to the mixer, divided by the speed of light.

Due to the time delay, there exists a certain frequency difference or offset $O_f$ between the two modes as measured at the optical mixer. The offset is equal to the propagation delay time multiplied by the tuning rate, which rate is approximately equal to total frequency swing times the modulation frequency.

It is desirable to use a relatively low modulation frequency, compared to the propagation time around the resonant cavity, in order to reduce noise and enhance linearity. In a square cavity, a total path length change of only one-half wavelength would be required with a modulation frequency of 1MHz to produce a frequency offset of 250KHz.

However, due to the disposition of the modulating mirror at the corner of a square, a mirror displacement of only about 0.177 wavelength is required to achieve the 250KHz offset.

Referring now to FIG. 7, when the system is experiencing rotation, a certain amount of mode splitting $S_m$ is produced. The two lines $\omega_{cw}$ and $\omega_{ccw}$ represent the frequencies of the clockwise and counterclockwise modes, respectively, with no modulation. When modulation is applied, the $\omega_{cw}$ and $\omega_{ccw}$ components are added algebraically to the $B_{cw}$ and $B_{ccw}$ components, respectively. The result is a rduction in the output frequency $F_{ccw}$ for a counterclockwise rotation and an increase in the output frequency $F_{cw}$ for a clockwise rotation.

The overall output is shown in FIG. 8 to be linear with a non-rotating frequency equal to $O_f$ and variations below or above that point depending upon sense of rotation. It should be noted that the direction of frequency change can be reversed simply by inverting the modulating wave. By alternating rapidly between the inverted and non-inverted modulation modes, digital processing, such as described in U.S. Pat. No. 3,392,622 Senf, may be employed to achieve a high degree of accuracy. The system, however, may be operated in an analog mode without any additional circuitry to that shown in FIG. 5.

While certain advantageous embodiments have been chosen to illustrate the invention, it will be understood by those skilled in the art that various changes and modifications can be made therein without departing from the scope of the invention as defined in the attendant claims.

What is claimed is:

1. A rotary motion sensor comprising the combination of:

a closed polygonal optical loop;
reference optical beam generating means;
means for stimulating and maintaining bimodal coherent radiation circulating in said loop;
means for coupling radiation in one mode only from said loop to said reference beam generating means;

means responsive to the radiation coupled out of said loop for controlling the reference beam frequency at a frequency which differs from said one mode by a constant amount;
means for coupling radiation in said other mode out of said loop;
means for comparing the characteristics of the reference beam and said other mode beam; and
means for producing an output signal proportional to the difference between said reference beam and said other mode beam.

2. An apparatus according to claim 1 and further comprising:

means in said loop for modulating said bimodal radiation to prevent mode locking.

3. An apparatus according to claim 2 wherein said means for producing an output signal includes:

means in said means for producing an output signal for cancelling the modulation introduced to prevent mode locking.

4. An apparatus according to claim 1 wherein said means for stimulating radiation is a first laser; and
said reference beam generating means includes a second laser.

5. An apparatus according to claim 4 wherein said reference beam generating means further includes a totally reflective end mirror for said second laser; and wherein said means for controlling the reference beam frequency includes means for adjustably supporting said end mirror in response to a control signal; and
circuit means responsive to the reference beam and said one mode beam for developing said control signal.

6. In a rotary motion sensor of the type having a first closed optical path, laser means disposed in said path for producing radiation in both directions, the path including reflecting means for reflecting the radiation so that the radiation resonates in two modes, a second closed optical path, modulating means in the path for deflecting a portion of the radiation in each mode into the second path in accordance with a signal of predetermined frequency, a signal generator for generating a modulating signal of the predetermined frequency, circuit means for connecting the signal to the modulator and semireflective means for coupling radiation mode beams from both modes out of said second path, the improvement comprising:

means for generating a reference optical beam at a controlled frequency;
beam splitting means for dividing said reference beam into two components;
first optical mixer means for accepting two optical beams and for producing an electrical signal representative of the frequency difference therebetween;
means for directing one of said components and one mode beam from said second path to said first mixer means;

second optical mixer means for accepting two optical beams and for producing an electrical signal representative of the frequency difference therebetween;

means for directing the other of said reference beam components and the other mode beam from said second path to said second mixerm means;

means for combining the modulating signal individually with the electrical signal outputs of said first and second optical mixer means to produce third and fourth signals;

means responsive to said third signal for controlling the frequency of said reference beam at a constant frequency separation from one of said mode beams; and means for comparing the phase relationships of said third and fourth signals.

\* \* \* \* \*